July 30, 1940.  R. CAMPBELL ET AL  2,209,713
ARM FOR HANDLING DROP CENTER TIRES ON WEAVER TIRE MACHINES
Filed Dec. 18, 1937
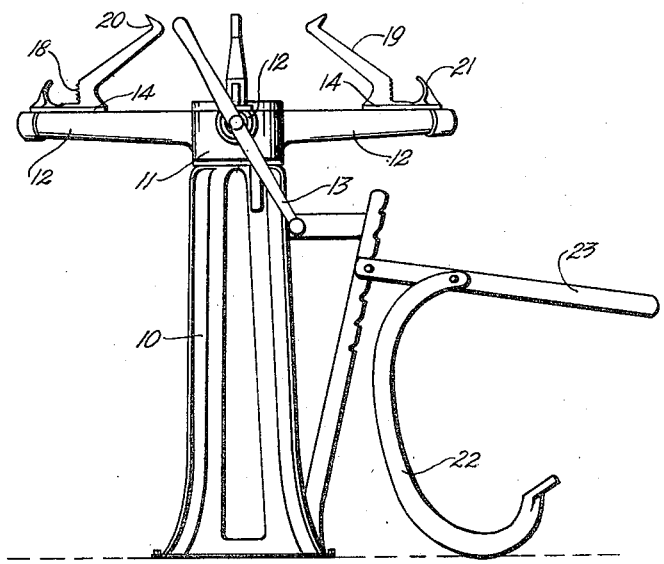
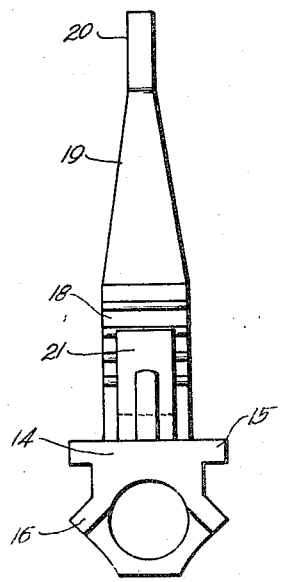
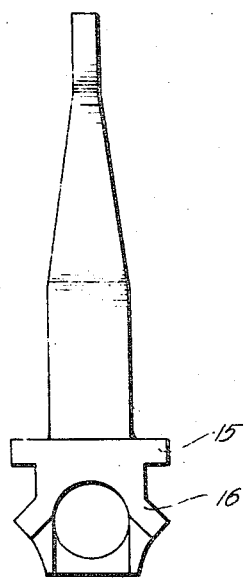
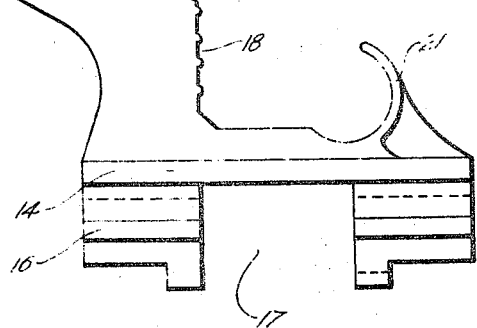
Inventors
RED CAMPBELL
JESS J. MATTHEWS
By Hazard and Miller
Attorneys Patented July 30, 1940

2,209,713

UNITED STATES PATENT OFFICE 2,209,713

ARM FOR HANDLING DROP CENTER TIRES ON WEAVER TIRE MACHINES

Reed Campbell and Jess J. Matthews, Taft, Calif.; said Matthews assignor to said Campbell Application December 18, 1937, Serial No. 180,551

1 Claim. (Cl. 144—288)

This invention relates to an arm for tire machines. The arm has been particularly designed for use upon a tire machine now on the market and generally known as the "Weaver Universal Tire Changer".

In that type of machine there is a suitable supporting standard having three radially extending arms which provide ways for tire engaging arms. A screw mechanism is used to simultaneously expand and contract the three tire or rim-engaging arms on the machine. At one side of the machine there is disposed a gooseneck operable by a lever useful for breaking tires loose from the rims on which they are mounted.

With the advent of drop center rims difficulty has been experienced in mounting wheels or rims having the drop center on the conventional Weaver machine. One difficulty particularly noticed is that when a drop center construction is applied to the Weaver tire machine it is impossible in most instances to have the gooseneck slipped over the top of the tire to pull the tire loose.

It is an object of the present invention to provide an arm which may be applied to the conventional Weaver machine in place of the tire-engaging arms thereon and which will also support a wheel or rim having a drop center that the gooseneck may always be employed to free the tire from the rim.

More specifically, it is an object of the invention to provide an arm applicable to a Weaver tire machine wherein the arm presents an upwardly and inwardly inclined arm or extension which carries a hook engageable with the hub of the wheel and which is of such elevation that it will position the tire and wheel at a proper height to enable utilization of the gooseneck on the machine.

Another object of the invention is to provide an arm having the above-mentioned characteristics and which is so designed as to be useful to contract flat base rims and to expand them.

With the foregoing and other objects in view, which will be made manifest in the following detailed description and specifically pointed out in the appended claim, reference is had to the accompanying drawing for an illustrative embodiment of the invention, wherein:

Figure 1 is a view in side elevation of a conventional Weaver Universal Tire Changer illustrating the arms embodying the present invention as having been applied thereto;

Fig. 2 is a view in end elevation of the outer side of one of the arms;

Fig. 3 is a view in end elevation illustrating the inner side of one of the arms; and Fig. 4 is a view in side elevation of one of the arms.

Referring to the accompanying drawing wherein similar reference characters designate similar parts throughout, the conventional Weaver Universal Tire Changer consists of a suitable standard 10 on which is rotatably mounted a body 11 carrying three radial arms 12. Within these arms there are disposed screws which are operable by means of a crank 13 and the screws carry suitable nuts, not shown, which serve to expand and contract tire-engaging arms which are slidable on ways formed in the three radial arms 12. The arm forming the present invention is illustrated in detail in Figs. 2, 3, and 4 consisting of a body 14 having laterally extending flanges 15 and a bottom 16 so shaped as to fit and slide upon the ways provided on arms 12. Centrally of the body 14 there is formed a recess 17 which accommodates the nuts on the screws which are within the arms 12. The arm presents an upright surface 18 from the top of which an inclined surface 19 extends upwardly and inwardly terminating in a hook 20 engageable with the hub of a wheel having a drop center rim. The upright surface 18 faces outwardly and in opposition thereto there is a curved hook 21 facing inwardly which is useful for contracting flat base rims. The distance between the upright surface 18 and the back of the hook 21, we prefer to be in the neighborhood of three inches. The height of the upright surface 18 we prefer to be about two inches, and the length of the inclined surface 19 we prefer to be in the neighborhood of seven inches.

In order to accommodate wheels and tires of different sizes the inclination of the inclined surface 19 on the top of the upwardly and inwardly extending arm should be in the neighborhood of 64° from the vertical. This inclination of the surface 19 is such that the hook 20 is positioned a relatively short distance above the ways of the machine. This is important for several reasons. If the hook 20 is too high above the ways the level of the wheel and its tire is so high above the floor that the average man cannot work with it. Furthermore, and what is probably most important, if the hooks 20 are too high so as to support the wheel in too high a position above the ways it is impossible to swing the gooseneck 22 over the tire. By adopting the inclination of 64° from the vertical or approximately that inclination and having the inclined surface 19 extend upwardly and inwardly from the top of the upright surface 18 which in turn terminates only a short distance above the top of hook 21 the hooks 20 are positioned a relatively short distance above the ways so as to hold the wheel at the proper level to enable a man to conveniently work with it and also to enable the utilization of gooseneck 22.

With arms thus constructed it is possible to take off the conventional arms on the Weaver Universal Tire Changer and to replace them with the arm disclosed herein. The arms will fit and slide smoothly on the ways on arms 12 and may be advanced or retracted by rotating crank 13. The upright surface 18 and the hooks 21 may be employed as heretofore on wheels and rims of the flat base type. Where, however, wheels having drop center rims are to have their tires changed or repaired the hubs of the wheels may be positioned on the inclined surface 19 with the hooks 20 expanded into tight and firm engagement therewith. With the inclination of the arms substantially as shown and described the elevation of the wheel with respect to the gooseneck 22 which is operable by lever 23 is such that the gooseneck can always be employed to break the tire free from the rim.

From the above-described construction it will be appreciated that these arms are of relatively simple and durable construction and may be easily and quickly installed on the conventional Weaver Universal Tire Changer. When so installed the utility of the device is materially increased in that drop center rim constructions may be so positioned with respect to the gooseneck that the gooseneck may always be employed to free the tire. At the same time the upright surface 18 and hook 21 may be used on other types of rims. In the preferred form of construction the top of hook 21 is slightly below the top of the upright surface 18 but is not below the extension of the straight inclining surface 19.

While the improved arm has been primarily designed for use on the Weaver Universal Tire Changer, it may be applied to other tire changing machines of like design by forming the body of the arm so as to fit its ways and their contracting and expanding mechanism.

Various changes may be made in the details of construction without departing from the spirit or scope of the invention as defined by the claim.

We claim:

An arm for tire machines comprising a body adapted to fit and slide on the radial slideways of the machines, said body presenting an outwardly facing upright surface, the top of said surface extending approximately three inches above the top surface of said slideways, an elongated wheel holding element formed integral with said body and having a straight upwardly and inwardly inclined surface extending radially inwardly for a distance of approximately seven inches measured along the inclined surface having an inclination of about 64° from the vertical, and an outwardly facing hook at the inner end of said inclined surface, whereby the gooseneck usually provided on such machines may be employed to break a tire free from the wheel rim.

REED CAMPBELL.
JESS J. MATTHEWS.